(12) United States Patent
Lee et al.

(10) Patent No.: US 6,375,321 B1
(45) Date of Patent: *Apr. 23, 2002

(54) METHOD AND DEVICE FOR COUPLING SPECTACLES AND CLIP-ON SUNSHADES WITH EACH OTHER

(76) Inventors: Suk Jae Lee; Ju Jae Lee, both of 860 Chim-San 1-Dong, Buk-Gu, Taegu (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/689,646

(22) Filed: Oct. 13, 2000

Related U.S. Application Data

(63) Continuation-in-part of application No. 09/458,711, filed on Dec. 13, 1999, now Pat. No. 6,231,179.

(30) Foreign Application Priority Data

Oct. 23, 1999 (KR) .......................................... 1999-22922

(51) Int. Cl.⁷ ................................................. G02C 9/00
(52) U.S. Cl. .......................................... 351/47; 351/57
(58) Field of Search ............................. 351/47, 57, 48, 351/58, 41; 360/126, 120, 125, 127

(56) References Cited

U.S. PATENT DOCUMENTS

| | | | |
|---|---|---|---|
| 5,029,032 A | * | 7/1991 | Yamada et al. ............. 360/126 |
| 5,568,207 A | | 10/1996 | Chao |
| 5,737,054 A | | 4/1998 | Chao |
| 5,877,838 A | | 3/1999 | Chao |
| 5,882,101 A | | 3/1999 | Chao |
| 5,883,688 A | | 3/1999 | Chao |
| 5,975,691 A | | 11/1999 | Ku |
| 6,012,811 A | | 1/2000 | Chao et al. |
| 6,109,747 A | | 8/2000 | Chao |
| 6,116,732 A | * | 9/2000 | Xiao ........................... 351/47 |
| 6,231,179 B1 | * | 5/2001 | Lee ............................. 351/47 |

* cited by examiner

*Primary Examiner*—Hung Xuan Dang
(74) *Attorney, Agent, or Firm*—Jacobson Holman, PLLC

(57) ABSTRACT

Disclosed is a method and a device for coupling spectacles and clip-on sunshades with each other, the spectacles having first lens frames connected together at their inner ends by a first nose frame, lenses fitted into respective first lens frames and arms mounted to outer ends of the first lens frames through hinges, the clip-on sunshades having second lens frames connected together at their inner ends by second nose frame and tinted lenses fitted into respective second lens frames. The device comprises a permanent magnet disposed to one of the spectacles and the clip-on sunshades at a predetermined position in a manner such that the soft magnetic member of the other of the spectacles and sunshades can be mated with the permanent magnet thereby to couple the spectacles and the clip-on sunshades with each other.

52 Claims, 11 Drawing Sheets

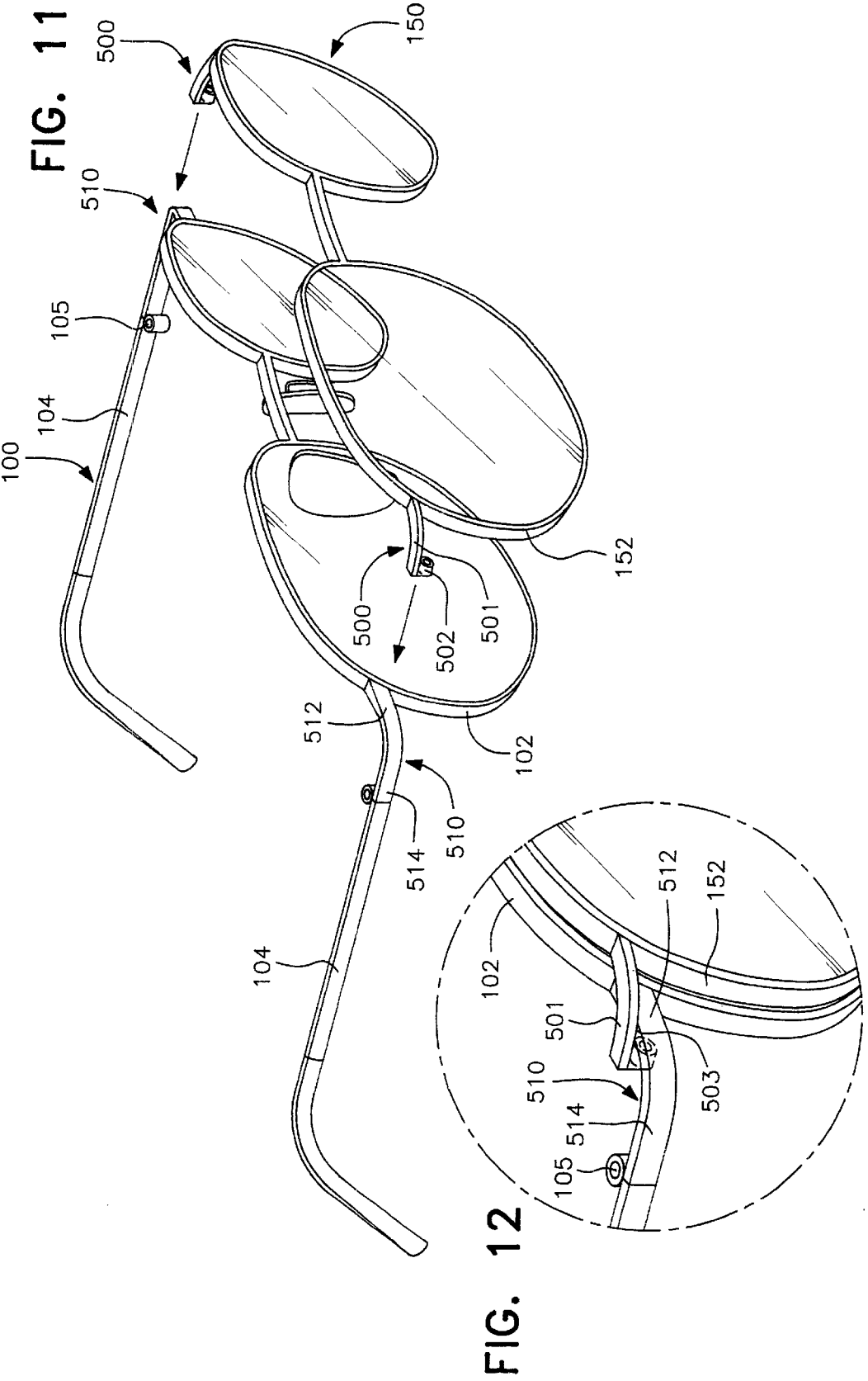

METHOD AND DEVICE FOR COUPLING SPECTACLES AND CLIP-ON SUNSHADES WITH EACH OTHER

This is a Continuation-In-Part of application Ser. No. 09/458,711 filed on Dec. 13, 1999 now U.S. Pat. No. 6,231,179.

BACKGROUND OF THE INVENTION

1. Field of the Invention

The present invention relates to a method and a device for coupling spectacles and clip-on sunshades with each other, and more particularly, the present invention relates to a method and a device for coupling spectacles and clip-on sunshades with each other, which enable sunglasses referred to as "clip-on sunshades" not having arms to be detachably coupled to spectacles.

2. Description of the Related Art

Generally, spectacles are used for the purpose of enhancing the eyesight of a person who has defective vision. Sunglasses help to protect the eyes from strong light which may cause damage to the eyes. Ordinary spectacles comprise lens frames connected together at their inner ends by a nose frame, lenses fitted into respective lens frames, and arms mounted to outer ends of the lens frames through hinges.

Eyesight is divided into normal eyesight, nearsightedness, farsightedness and astigmatism. If incoming parallel lights are imaged such that an image is focused in front of the retina, nearsightedness (myopia) exists, whereby an observer can properly view close objects, but has a poor view of distant objects. By utilizing concave lenses within spectacles, nearsightedness can be adequately corrected. If incoming parallel lights are imaged such that an image is focused behind the retina, farsightedness (hyperopia) exists, whereby an observer has a poor view of close objects, but can properly view distant objects. In the case of astigmatism, due to the fact that a spherical surface of the eyeball, especially the cornea, is not even, incoming parallel lights cannot be focused directly to a point on the retina, whereby an observer cannot properly focus his eyesight.

While, as described above, spectacles are used for enhancing the eyesight of a person who has defective vision, in hot summer weather when ultraviolet rays dominate, a spectacle wearer requires sunglasses with corrective lenses.

In other words, unlike non-prescription sunglasses which are worn by persons who do not have vision defects, in the case of persons who wear spectacles due to an ocular refractive error, separate sunglasses having vision-corrective lenses of a power which corresponds to that of the user's normal spectacle lenses must be used, which can be expensive.

To cope with this problem, clip-on sunshades which do not have arms and to which tinted lenses are mounted, are attached in front of the spectacles, thereby rendering the same vision enhancing effect as can be achieved by wearing conventional vision-corrective sunglasses having arms.

Referring to FIG. 9, there is shown a cross-sectional view illustrating a state wherein spectacles and clip-on sunshades according to the conventional art are coupled with each other. The spectacles 10 have first lens frames 2 which are connected together at their inner ends by a first nose frame 3, lenses 1 which are fitted into respective first lens frames 2, and arms 4 which are mounted to outer ends of the first lens frames 2 through hinges 5. The clip-on sunshades 20 have second lens frames 22 which are connected together at their inner ends by a second nose frame 23, and tinted lenses 21 which are fitted into respective second lens frames 22.

In order to couple the spectacles 10 and the clip-on sunshades 20 with each other, the first nose frame 3 of the spectacles 10 and the second nose frame 23 of the clip-on sunshades 20 are formed with accommodating grooves 25 and 26, respectively, and permanent magnets 27 and 28 are inserted into the accommodating grooves 25 and 26, respectively, whereby the clip-on sunshades 20 are stably coupled to the spectacles 10 by virtue of magnetic force of the permanent magnets 27 and 28.

However, the above-described coupling structure between the spectacles 10 and the clip-on sunshades 20 suffers from defects in that, since the accommodating grooves 25 and 26 for receiving the permanent magnets 27 and 28 must be defined in the spectacles 10 and the clip-on sunshades 20, respectively, sizes of the first and second nose frames 3 and 23 are enlarged, and limitations are imposed on design freedom for the spectacles 10 and the clip-on sunshades 20. Moreover, due to weight of the first and second nose frames 3 and 23 and the permanent magnets 27 and 28 which have enlarged sizes, the entire weight of the combination including the spectacles 10 and the clip-on sunshades 20 is increased, and wearing comfort is reduced.

In addition, due to the fact that the permanent magnets 27 and 28 should be mounted to the first and second nose frames 3 and 23 of the spectacles 10 and the clip-on sunshades 20, respectively, assembly operations must be carefully performed while paying attention to directional characteristics of the permanent magnets 27 and 28 which depend upon magnetic poles, increasing the difficulty of assembly and reducing productivity. In the worst case, if the permanent magnets 27 and 28 are misassembled, it is impossible to couple the clip-on sunshades 20 to the spectacles 10.

In particular, as shown in FIG. 10 which is a view illustrating magnetic flux distribution between the spectacles 10 and the clip-on sunshades 20, in the case that the spectacles 10 and the clip-on sunshades 20 are coupled with each other using the pair of permanent magnets 26, 27 and 28, the North and South poles N and S of the permanent magnets 26, 27 and 28, which adjoin to each other, are properly coupled with each other by attractive force generated therebetween. However, because magnetic force which is generated in the North and South poles N and S of the permanent magnets 26, 27 are maintained in an opened status, the magnetic force is dissipated and lost to the outside, whereby coupling force between spectacles 10 and the clip-on sunshades 20 is significantly reduced.

SUMMARY OF THE INVENTION

Accordingly, the present invention has been made in an effort to solve the problems occurring in the related art, and an object of the present invention is to provide a method and a device for coupling spectacles and clip-on sung-shades with each other, which enables the spectacles and clip-on sunshades to be easily coupled with each other, simplifies manufacturing and assembling procedures of coupling means, reduces costs of the spectacles and clip-on sunshades, and enlarges freedom in designing spectacles and clip-on sunshades. The present invention also enhances productivity and quality of the spectacles and clip-on sunshades, preventing the clip-on sunshades coupled to the spectacles from being undesirably uncoupled from the spectacles and improving user convenience.

In order to achieve the above objects, according to one aspect of the present invention, there is provided a device for coupling spectacles and clip-on sunshades with each other, the spectacles having first lens frames connected together at their inner ends by a first nose frame, lenses fitted into respective first lens frames and arms mounted to outer ends of the first lens frames through hinges, the clip-on sunshades having second lens frames connected together at their inner ends by a second nose frame and tinted lenses fitted into respective second lens frames. The device includes a permanent magnet mounted to or otherwise part of either one of the spectacles or the clip-on sunshades at a predetermined position, and a soft magnetic member mounted to or otherwise part of the other of the spectacles or the clip-on sunshades at a preset position in a manner such that the soft magnetic member can be mated with the permanent magnet thereby coupling the spectacles and the clip-on sunshades with each other.

BRIEF DESCRIPTION OF THE DRAWINGS

The above objects, and other features and advantages of the present invention will become more apparent after a reading of the following detailed description when taken in conjunction with the drawings, in which:

FIG. 11 is an exploded perspective view illustrating spectacles and clip-on sunshades in accordance with another embodiment of the present invention; and FIG. 12 is an perspective view of the magnetic connection between the spectacles and the clip-on sunshades as coupled together in accordance with the embodiment of FIG. 11.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerable will be used throughout the drawings and the description to refer to the same or like parts.

Figure 1:
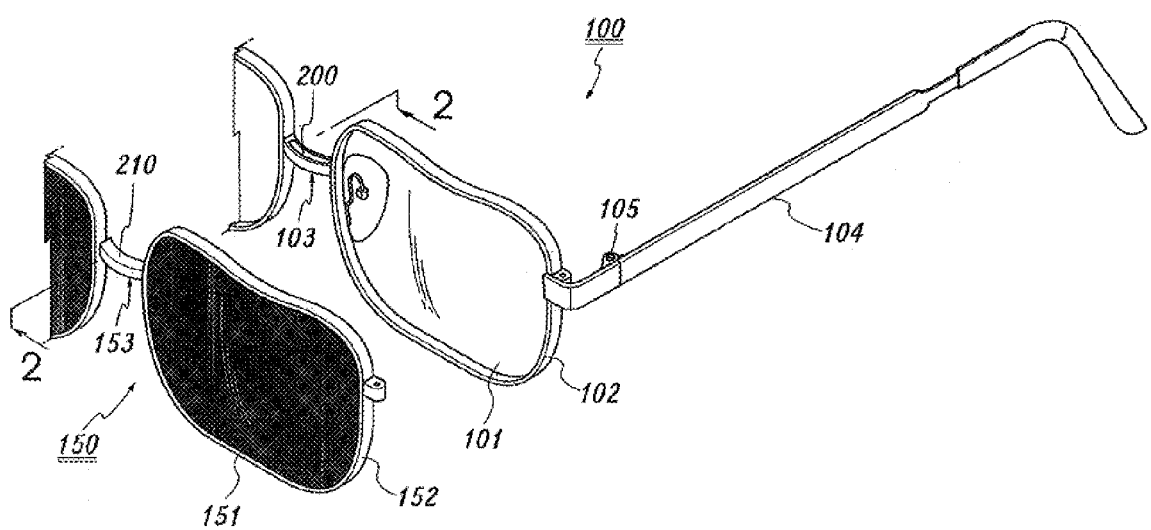
FIG. 1 is an exploded perspective view illustrating spectacles and clip-on sunshades in accordance with a first embodiment of the present invention.
Figure 2:
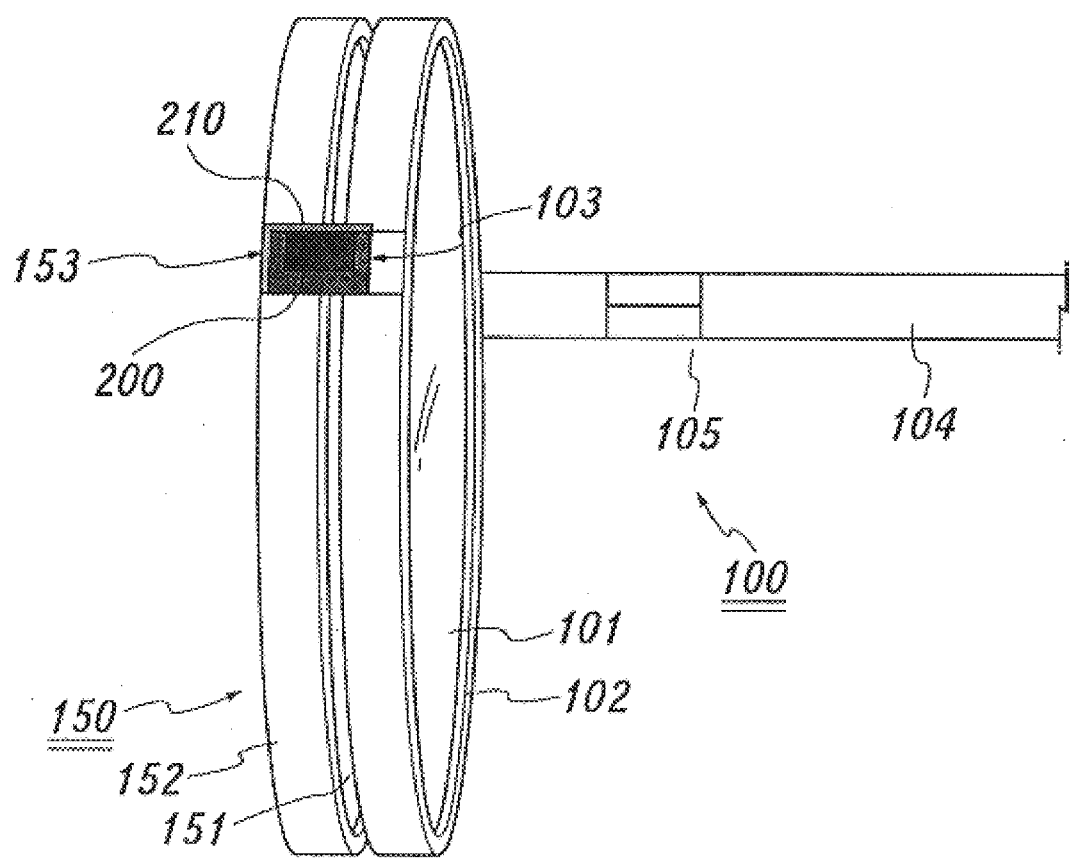
FIG. 2 is a cross-sectional view taken along the line A—A of FIG. 1, illustrating a state wherein the spectacles and the clip-on sunshades are coupled with each other.
Figure 3:
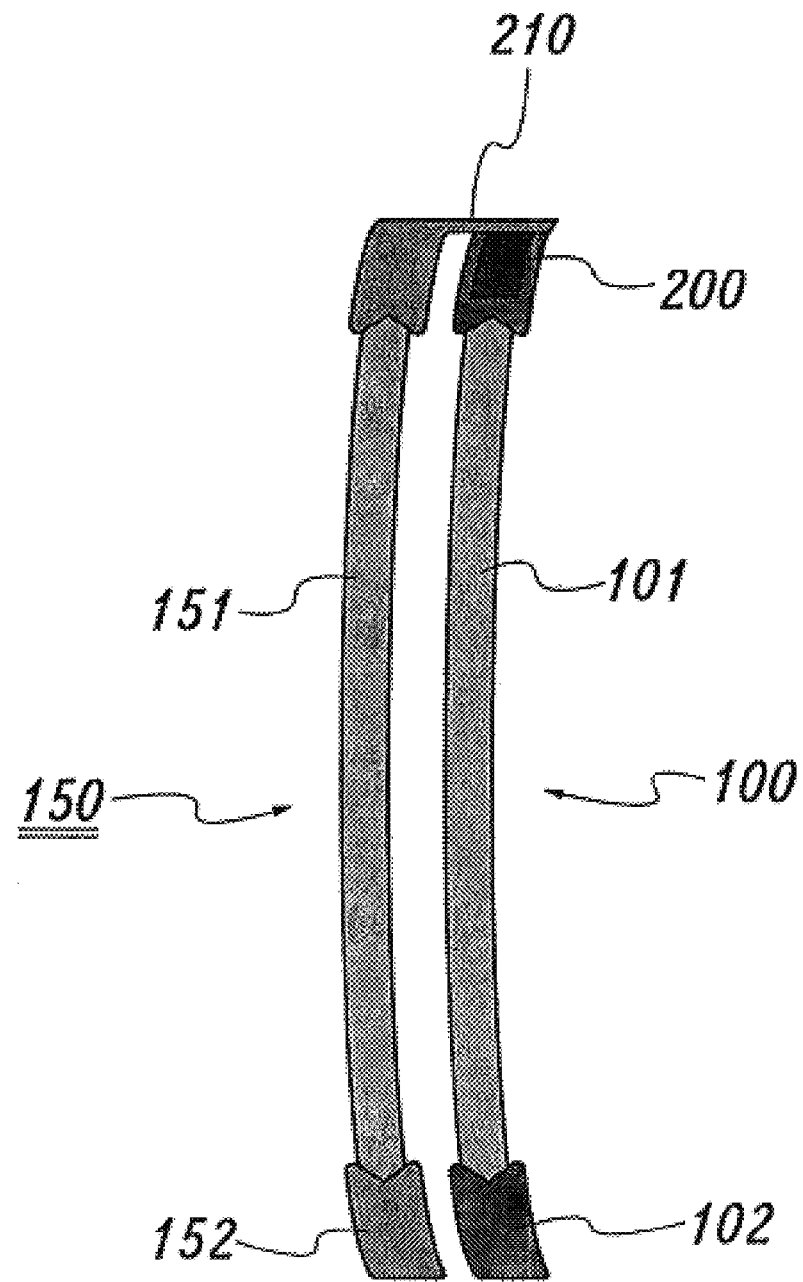
FIG. 3 is a cross-sectional view illustrating a state wherein spectacles and clip-on sunshades in accordance with a second embodiment of the present invention are coupled with each other.
Figure 4A:
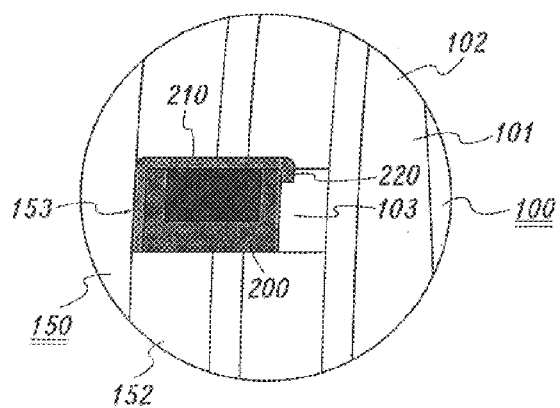
FIGS. 4A and 4B are enlarged cross-sectional views each illustrating a state wherein spectacles and clip-on sunshades in accordance with a third embodiment of the present invention are coupled with each other.
Figure 4B:
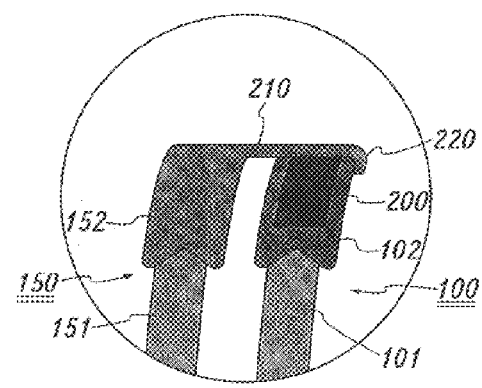
Figure 5:
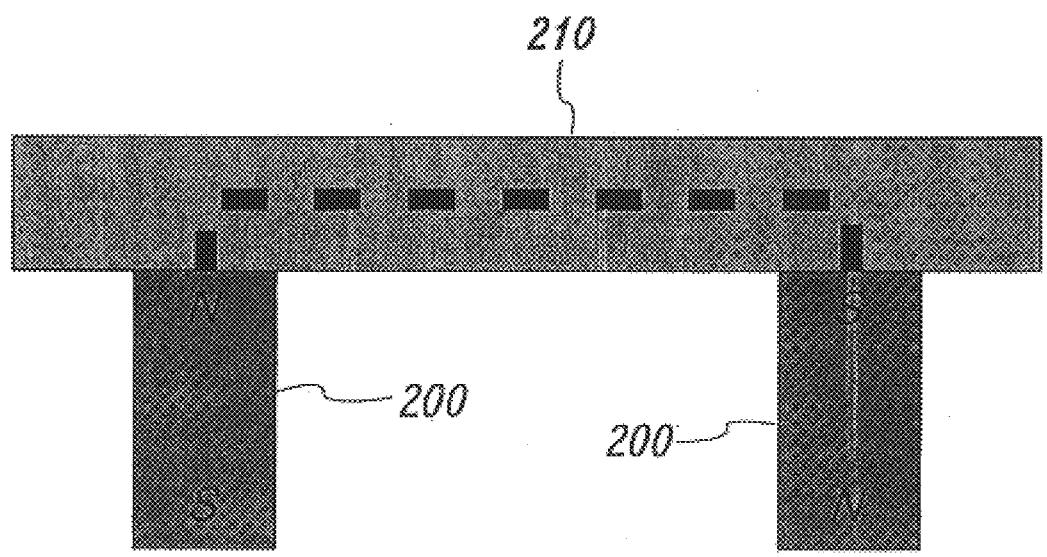
FIG. 5 is a view illustrating magnetic flux distribution between the spectacles and the clip-on sunshades which are coupled with each other in accordance with the present invention.

FIG. 1 is an exploded perspective view illustrating spectacles and clip-on sunshades in accordance with a first embodiment of the present invention. FIG. 2 is a cross-sectional view taken along the line A—A of FIG. 1, illustrating a state wherein the spectacles and the clip-on sunshades are coupled with each other. FIG. 3 is a cross-sectional view illustrating a state wherein spectacles and clip-on sunshades in accordance with a second embodiment of the present invention are coupled with each other. FIGS. 4A and 4B are enlarged cross-sectional views each illustrating a state wherein spectacles and clip-on sunshades in accordance with a third embodiment of the present invention are coupled with each other. FIG. 5 is a view illustrating magnetic flux distribution between the spectacles and the clip-on sunshades which are coupled with each other in accordance with the present invention.

The spectacles 100 have first lens frames 102 which are connected together at their inner ends by a first nose frame 103, lenses 101 which are fitted into respective first lens frames 102, and arms 104 which are mounted to outer ends of the first lens frames 102 through hinges 105. The clip-on sunshades 150 have second lens frames 152 which are connected together at their inner ends by a second nose frame 153, and tinted lenses 151 which are fitted into respective second lens frames 152.

In the present invention, the spectacles 100 and the clip-on sunshades 150 are coupled with each other by using soft magnetic members and permanent magnets. For this, as shown in FIGS. 1 and 2, a permanent magnet 200 is mounted to or otherwise part of the first nose frame 103 of the spectacles 100, and a thin plate-shaped soft magnetic member 210 constitutes the second nose frame 153 of the clip-on sunshades 150, whereby the spectacles 100 and the clip-on sunshades 150 may be coupled with each other. In this invention, soft magnetic member means metal material which acts with and adheres onto a magnet such as iron-based metal, nickel-based metal, etc. In preferred embodiments, such soft magnetic material may be embodied as Permalloy®, pure iron, carbon steel, low alloy steel or ferrite stainless steel.

Permalloy® includes alloys of nickel and iron containing more than 30% nickel and may representatively be comprised of 45% nickel and 55% iron, or 75% nickel and 25% iron. Other formulations suitable for use with a permanent magnet may also be used in accordance with the principles of the present invention. For example, an alloy of 76–80% nickel, 3–5% molybdenum and 3–6% copper, with the balance being iron, may be suitable. Another alternative is an alloy of 78–82% nickel, 4–7% molybdenum, 3–6% copper, with the balance being iron. Low alloy steel may include 95% iron, with the balance bing any combination of nickel and molybdenum. Carbon steel may include 1–20% carbon, with the balance being iron. These examples are representative only.

A further alternative is an alloy including iron, chromium and cobalt, representatively distributed as 50–65% iron, 20–30% chromium and 5–20% cobalt. An amount of 0.2–0.5% silicon may be added to this alloy. This Fe—Cr—Co or Fe—Cr—Co—Si alloy may be used as the soft magnetic material as with the other alloys. In addition, this Fe—Cr—Co or Fe—Cr—Co—Si alloy may itself be magnetized so as to act as the magnet used with the invention.

Accordingly, the Fe—Cr—Co or Fe—Cr—Co—Si may be the magnet while another of the alloy alternatives serves as the soft magnetic material. Alternatively, non-magnetized Fe—Cr—Co or Fe—Cr—Co—Si alloy may be the soft magnetic material while magnetized Fe—Cr—Co or Fe—Cr—Co—Si alloy is the magnet. As with other magnets and soft magnetic materials, the Fe—Cr—Co or Fe—Cr—Co—Si alloy may be used on any part of the spectacles and/or sunshades.

Unlike other magnetic material, the Fe—Cr—Co or Fe—Cr—Co—Si alloy is easily processed to form any part of the spectacles such as frontal hinges, bridges or frames. Furthermore, this magnetized or non-magnetized alloy is easily welded to other parts, that may be made of different materials.

As discussed, a range of alloys may be used for the soft magnetic material. In a method of manufacturing the soft magnetic material, it is beneficial to subject the material to a heat treatment at a temperature of approximately 1100° C. for one hour in a $H_2$ environment.

The permanent magnet 200 and the soft magnetic member 210 are not limited to the first and second nose frames 103 and 153. Instead, as shown in FIG. 3, the permanent magnet 200 and the soft magnetic member 210 can be used to constitute the first and second lens frames 102 and 152 or fastening pieces for fastening lenses 101 and 151 which are fitted in the first and second lens frames 102 and 152, respectively. The soft magnetic member may also be made as the hinge member that adjoins the lens frames 102, the stud on the lens frames 152, or as any other part of the spectacles or clip-on sunshades suitable for coupling as described herein. The soft magnetic member may also be a piece which is welded onto any part of the spectacles and/or clip-on sunshades.

While, in the illustrated embodiment, the permanent magnet 200 is mounted to the spectacles 100 and the soft magnetic member 210 is part of the clip-on sung-shades 150, persons skilled in the art will appreciate that the permanent magnet 200 may be mounted to the clip-on sunshades 150 and the soft magnetic member 210 may be mounted to the clip-on sunshades 150 and the soft magnetic member 210 may be part of the spectacles 100.

Furthermore, as shown in FIGS. 4A and 4B, the soft magnetic member 210 which may be part of the spectacles 100 or the clip-on sunshades 150, can be formed integrally with a release-preventing piece 220 which prevents the clip-on sunshades 150 coupled to the spectacles 100 from being inadvertently uncoupled therefrom.

Of course, contours of the permanent magnet 200, soft magnetic member 210 and release-preventing piece 220 vary depending upon configurations of the spectacles 100 and clip-on sunshades 150 and their positional arrangement. That is to say, the permanent magnet 200, soft magnetic member 210 and release-preventing piece 220 can have straight line-shaped, bent, rounded or curved contours.

As described above, in the present invention, when it is required to protect eyes from ultraviolet rays while wearing spectacles 100, the clip-on sunshades 150 can be coupled to the spectacles 100 in front of the spectacles 100 in a state wherein the spectacles 100 are already being worn on the user's face. Accordingly, the inconvenience of having to wear separate spectacles is eliminated.

Namely, if the clip-on sunshades 150 are coupled to the spectacles 100 in front of the spectacles 100, the permanent magnet 200 which is located at the predetermined position on one of the spectacles 100 or the clip-on sunshades 150 and the soft magnetic member 210 which is located at a preset position on the other of the spectacles 100 or the clip-on sunshades 150, are coupled with each other. In this way, it is possible to continuously maintain the coupled state of the spectacles 100 and the clip-on sunshades 150. The predetermined and preset positions can be defined on the first and second nose frames 103 and 153, first and second lens frames 102 and 152, hinge members, connecting pieces, etc. Connecting pieces may include any structure on the sunshades designed to allow the sunshades to be coupled to the spectacles.

In the case that the permanent magnet 200 and the soft magnetic member 210 are coupled with each other, as shown in FIG. 5, which is a view illustrating magnetic flux distribution between the spectacles and the clip-on sunshades which are coupled with each other in accordance with the present invention, magnetic flux which is generated from the North pole N or the South pole S of the permanent magnet 200 which is coupled to the soft magnetic member 210 is focused to the South pole S or the North pole N of the permanent magnet 200 through the soft magnetic member 210, to enable the spectacles 100 and the clip-on sunshades 150 to be coupled to each other with stronger magnetic force.

In other words, the soft magnetic member 210 which is coupled to the permanent magnet 200, serves as a magnetic closed circuit for magnetic flux, thereby preventing magnetic flux from being lost and increasing coupling force.

Moreover, by the release-preventing piece 220 which is integrally formed with the soft magnetic member 210, the clip-on sunshades 150 are prevented from being undesirably uncoupled from the spectacles 100. Also, because the soft magnetic member 210 is made of a thin plate-shaped metal segment and only one permanent magnet 200 is used, vigorous activity or exercise can be undertaken while the spectacles 100 are worn on the user's face, the weight of the spectacles 100 and the clip-on sunshades 150 can be minimized, and manufacturing procedures can be achieved in an easy manner.

Figure 6:
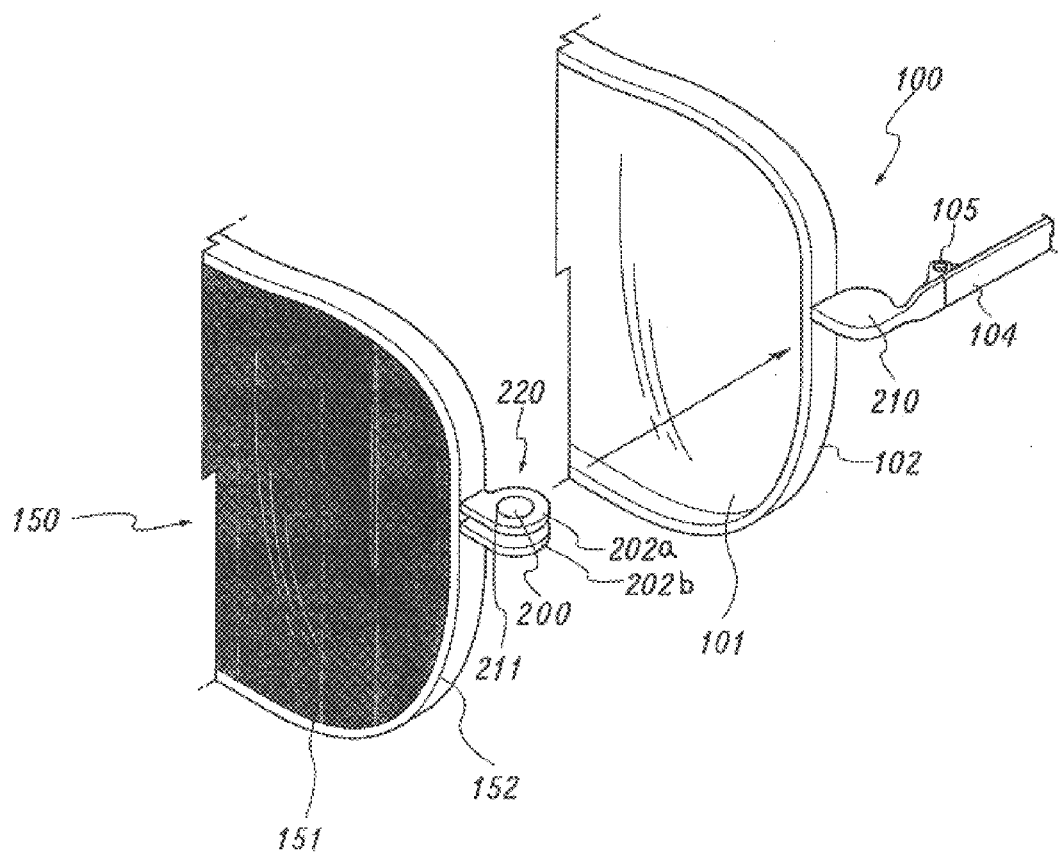
FIG. 6 is an exploded partial perspective view illustrating spectacles and clip-on sunshades in accordance with another embodiment of the present invention.
Figure 7:
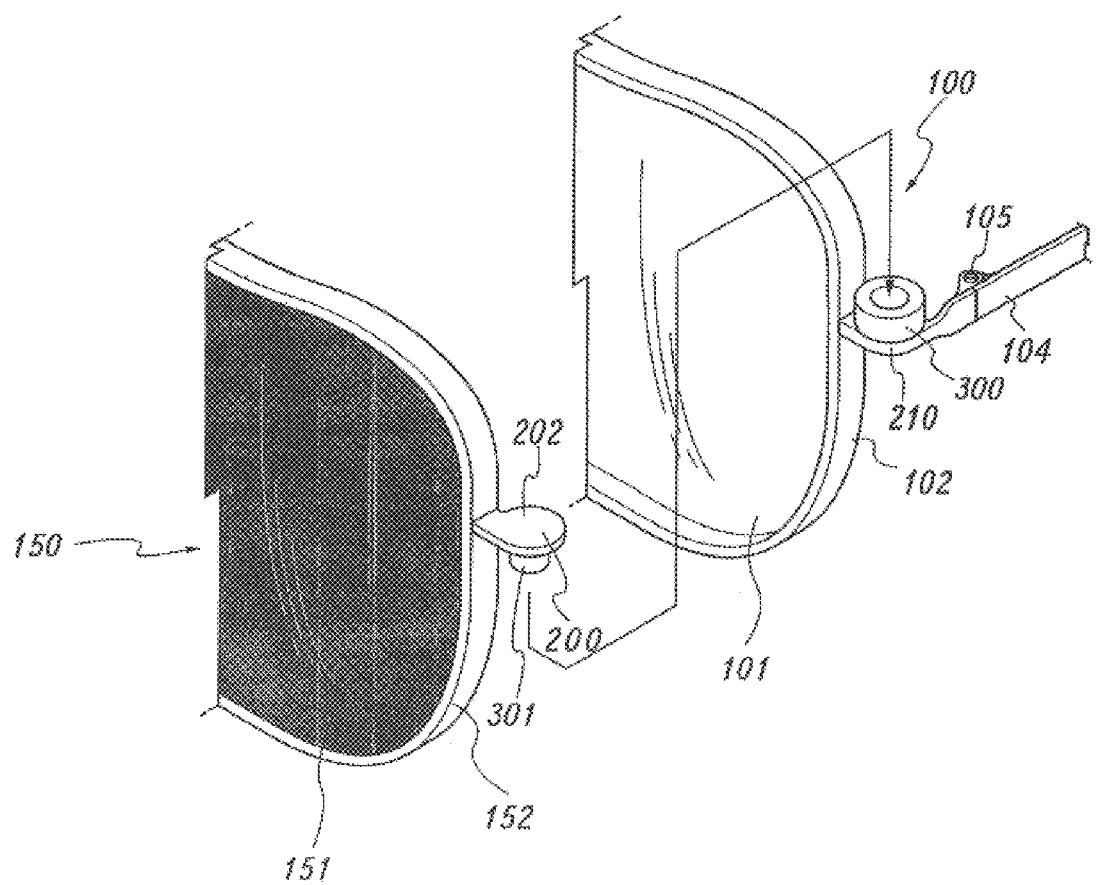
FIG. 7 is an exploded partial perspective view illustrating spectacles and clip-on sunshades in accordance with other embodiment of the present invention.
Figure 8:
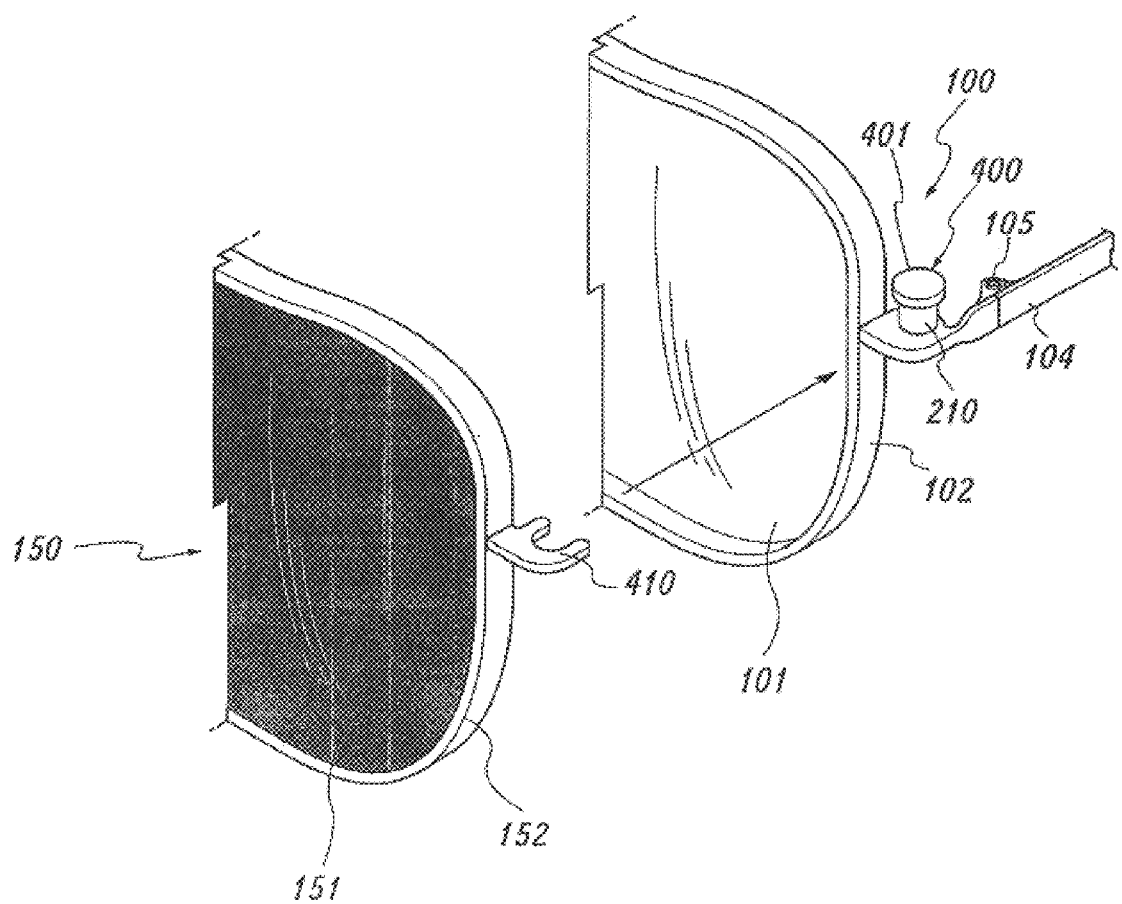
FIG. 8 is an exploded partial perspective view illustrating spectacles and clip-on sunshades in accordance with other embodiment of the present invention.
Figure 9:
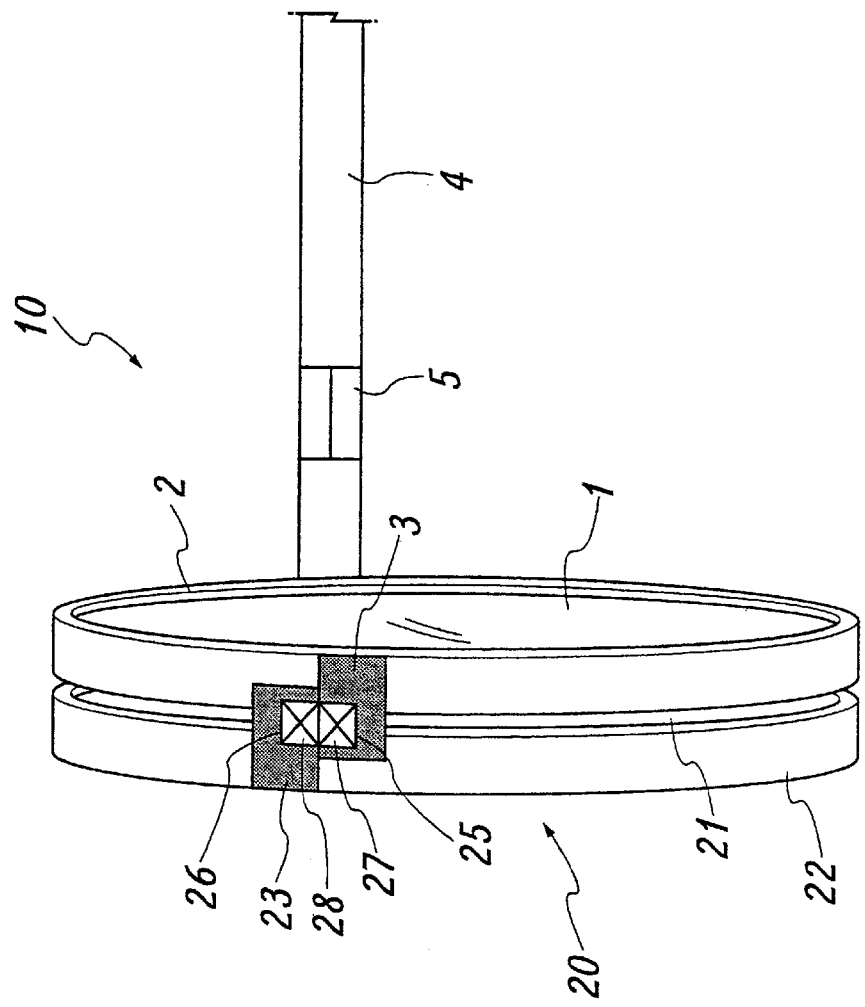
FIG. 9 is a cross-sectional view illustrating a state wherein spectacles and clip-on sunshades according to the conventional art are coupled with each other.

FIGS. 6, 7 and 8 show other embodiments of this invention directed to coupling of the sunshades to the spectacles using an interlocking hinge member. As shown in these figures, the interlocking hinge member on the sunshades acts in close cooperation with the frontal hinge member, with one being fitted within the other or otherwise sandwiched thereby for a measured interlocking fit.

The embodiment of FIG. 6 shows the above magnetic apparatus made on the frontal hinge assembly which connects the lens frame 102 and arms 104. The frontal hinge member 210 of lens frame 102 is made of a soft magnetic material and has an upper planar surface and a lower planar surface. The corresponding interlocking hinge member 220 of sunshades 150 includes one or more extruded plates 202.

Figure 10:
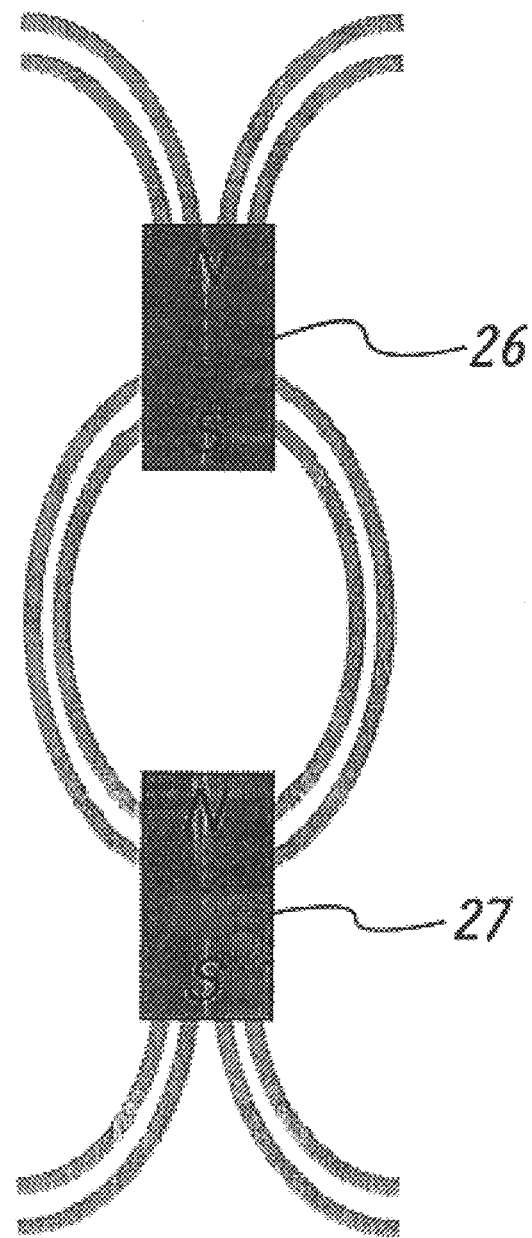
FIG. 10 is a view illustrating magnetic flux distribution between the spectacles and the clip-on sunshades which are coupled with each other according to the conventional art.

As shown in FIG. 6, the extruded plates include an upper extruded plate 202a and a lower extruded plate 202b. While either plate could be used, in FIG. 6 the upper extruded plate 202a contains a permanent magnet 200 in magnet hole 211 to make a closed loop of magnetic flux as shown in FIG. 10. In this embodiment, places like frontal hinge member 210 of lens frame 102, where a soft magnetic material is used, can receive instead a permanent magnetic member and vice versa, and can be fully magnetized by a special device like a magnetizer instead of having an individual permanent magnet 200 inserted.

Another embodiment shown in FIG. 7 has the same notation as that of FIG. 6 but has a different structure for the hinge members. The frontal hinge member 210 includes a receiving member 300 shaped like a piece of tube opened upward and made of a soft magnetic material to form a hollow center portion for receiving the inserting member 301 of the corresponding interlocking hinge member 202 of sunshades 150. The inserting member 301 is made of a permanent magnet, or magnetized, and extruded downward to be inserted into the receiving member 300. The two corresponding members of the receiving member 300 and inserting member 301 can be substituted with each other. In the preferred embodiment shown in FIG. 7, the inserting member 301 has a circular circumference and the hollow center portion of the receiving member 300 also has a circular circumference. However, the hollow center portion and the mating surface of the inserting member 301 could have other shapes provided the fit was complementary. For example, the outer surface of the inserting member 301 could be rectangular, in which case the hollow center portion would also preferably be rectangular to mesh properly in accordance with the invention.

FIG. 8 shows clip-on sunshades in accordance with another embodiment of the present invention having the same notation as that of FIG. 6 but having a different structure for the hinge members. In this embodiment, the frontal hinge member includes a receiving member 400 made of a soft magnetic material having an upwardly extending part 210 topped with a stopper head or button 401. In the preferred embodiment shown, the button has an outer circumference that is greater than an outer circumference of the upwardly extending part 210.

The upwardly extending part 210 is preferably shaped like a tube, but other shapes may also be used. The interlocking hinge member 410 on the sunshades is comprised of a U-shaped inserting member made of a permanent magnet and having two arms. The interlocking hinge member 410 may also be shaped like a hook, or given any other shape that is complementary to the shape of the upwardly extending part 210. When the clip-on sunshades are mounted on the spectacles, an inner surface of the inserting member interfaces with an exterior surface of the upwardly extending part. In FIG. 8, the tube-shaped upwardly extending part 210 is sandwiched between the two arms of the U-shaped inserting member. The button 401 prevents the sunshades from disengaging from the spectacles in an upward direction. As with the other embodiments, the magnet and the soft magnetic material may be reversed, so that the interlocking hinge member is made of a soft magnetic material and the frontal hinge member is a permanent magnet. The two corresponding members of the interlocking hinge member 410 and receiving member 400 may also be reversed.

FIG. 11 shows clip-on sunshades in accordance with another embodiment of the present invention, showing a different structure for the frontal hinge member 510 and employing an overlapping hinge member 500. In this embodiment, each of the overlapping hinge members 500 has a connecting arm member 501 with a permanent magnet 502 connected to a lower surface 503 of the connecting arm member 501. FIG. 12 shows the connection between the overlapping hinge member 500 and the frontal hinge member 510 when the sunshades 150 are coupled to the spectacles 100.

As shown in FIGS. 11 and 12, the frontal hinge member 510 preferably has an approximate L-shape, including a first portion 512 that extends outwardly from and substantially parallel with the plane of the first lens frames 102, and a second portion 514 that extends rearwardly in a direction corresponding to the orientation of the respective arm 104 mounted to the frontal hinge member 510. The Frontal hinge member 510 is made of a soft magnetic material.

The connecting arm member 501 of each interlocking hinge member 500 is directed outwardly and rearwardly. As noted, a permanent magnet 502 is affixed to a lower surface 503 of the connecting arm member 501 and oriented so that the bonding surface of the permanent magnet is substantially perpendicular to the lower surface 503 of the connecting arm member and facing forwardly. When the clip-on sunshades 150 are mounted on the spectacles 100, the connecting arm member 501 passes over the upper surface of the frontal hinge member 510 and the permanent magnet 502 attaches to a rear surface of the first portion 512 of the respective frontal hinge member 510.

As aforementioned above, according to the present invention, advantages are provided in that spectacles and clip-on sunshades are easily coupled with each other, manufacturing and assembling procedures of coupling means are simplified, and costs of the spectacles and clip-on sunshades are reduced. In addition, productivity in manufacture and quality of the spectacles and clip-on sunshades are enhanced, the clip-on sunshades coupled to the spectacles are effectively prevented from being undesirably uncoupled from the spectacles, and user convenience is improved.

In the drawings and specification, there have been disclosed typical preferred embodiments of the invention and, although specific terms are employed, they are used in a generic and descriptive sense only and not for purposes of limitation, the scope of the invention being set forth in the following claims.

We claim:

1. A device for coupling spectacles and clip-on sunshades with each other, comprising:

spectacles having first lens frames connected together at their inner ends by a first nose frame, lenses fitted into respective first lens frames, frontal hinge members made of soft magnetic material fixedly connected to respective outer ends of said first lens frames, and arms mounted to said frontal hinge members through hinges;

clip-on sunshades having second lens frames connected together at their inner ends by a second nose frame, tinted lenses fitted into respective second lens frames, and interlocking hinge members for interfitting with said frontal hinge members, each interlocking hinge member including a permanent magnet.

2. The device as set forth in claim 1, wherein each of said frontal hinge members has an upper planar surface and a lower planar surface, and each of said interlocking hinge members includes an upper extruded plate and a lower extruded plate, such that when said clip-on sunshades are mounted on said spectacles, said frontal hinge member is sandwiched between said upper and lower extruded plates, said upper extruded plate interfacing with said upper planar surface, and said lower extruded plate interfacing with said lower planar surface, said permanent magnet being a part of one of said upper and said lower extruded plates.

3. The device as set forth in claim 1, wherein each of said frontal hinge members has an upwardly protruding receiving member made of a soft magnetic material and including a hollow center portion, and each of said interlocking hinge members has an inserting member made of a permanent magnet and extruded downward to be inserted into said hollow center portion, such that when said clip-on sunshades are mounted on said spectacles an outer surface of said inserting member interfaces with and is surrounded by an inner surface of said hollow center portion.

4. The device as set forth in claim 3, wherein said receiving member is shaped like a piece of tube opened upward and said hollow center portion has a circular circumference, said outer surface of said inserting member also having a circular circumference.

5. The device as set forth in claim 1, wherein each of said frontal hinge members has a receiving member made of a soft magnetic material having a part shaped like a piece of tube opened upward and topped with a button having a circumference greater than a circumference of the part shaped like a piece of tube, and each of said interlocking hinge members has a U-shaped inserting member made of a permanent magnet and having two arms, such that when said clip-on sunshades are mounted on said spectacles the part shaped like a piece of tube is sandwiched between the two arms of said inserting member, said button preventing the sunshades from disengaging from the spectacles in an upward direction.

6. The device as set forth in claim 1, wherein each of said frontal hinge members has a receiving member made of a soft magnetic material having an upwardly extending part topped with a button having a circumference greater than a circumference of the upwardly extending part, and each of said interlocking hinge members has an inserting member made of a permanent magnet and shaped like a hook, such that when said clip-on sunshades are mounted on said spectacles an inner surface of said inserting member interfaces with an exterior surface of the upwardly extending part, said button preventing the sunshades from disengaging from the spectacles in an upward direction.

7. The device as set forth in claim 1, wherein the soft magnetic material is one of Permalloy®, iron, carbon steel, and ferrite stainless steel.

8. The device as set forth in claim 7, wherein said Permalloy® includes at least 40% nickel and 50% iron.

9. The device as set forth in claim 7, wherein said Permalloy® includes at least 70% nickel and 20% iron.

10. A device for coupling spectacles and clip-on sunshades with each other, comprising:
spectacles having first lens frames connected together at their inner ends by a first nose frame, lenses fitted into respective first lens frames, frontal hinge members made of soft magnetic material fixedly connected to respective outer ends of said first lens frames, and arms mounted to said frontal hinge members through hinges;
clip-on sunshades having second lens frames connected together at their inner ends by a second nose frame, tinted lenses fitted into respective second lens frames, and overlapping hinge members for engaging with said frontal hinge members, each overlapping hinge member including a rearwardly extending connecting arm member with a permanent magnet connected to a lower surface of said connecting arm member and oriented so that a primary bonding surface of the permanent magnet is substantially perpendicular to the lower surface of said connecting arm member and facing forwardly.

11. The device as set forth in claim 10, wherein each of said frontal hinge members has an approximate L-shape, having a first portion extending outwardly from and substantially parallel with said first lens frames, and a second portion extending rearward in a direction to match the respective mounted arm and each connecting arm member is directed outwardly and rearwardly with said permanent magnet connected to said lower surface thereof, such that when said clip-on sunshades are mounted on said spectacles, said connecting arm member passes over an upper surface of said frontal hinge member and said permanent magnet attaches to a rear surface of said first portion of said frontal hinge member.

12. The device as set forth in claim 10, wherein the soft magnetic material is one of Permalloy®, iron, carbon steel, and ferrite stainless steel.

13. The device as set forth in claim 12, wherein said Permalloy® includes at least 40% nickel and 50% iron.

14. The device as set forth in claim 12, wherein said Permalloy® includes at least 70% nickel and 20% iron.

15. A device for coupling spectacles and clip-on sunshades with each other, comprising:
spectacles having first lens frames connected together at their inner ends by a first nose frame, lenses fitted into respective first lens frames, frontal hinge members fixedly connected to respective outer ends of said first lens frames, and arms mounted to said frontal hinge members through hinges, at least one of said first lens frames, said first nose frame, said frontal hinge members and said arms including a permanent magnet or soft magnetic material;
clip-on sunshades having second lens frames connected together at their inner ends by a second nose frame, lenses fitted into respective second lens frames, and a connecting piece for coupling said clip-on sunshades to said spectacles, at least one of said second lens frames, said second nose frame and said connecting piece including a permanent magnet or soft magnetic material so as to function in a complementary way with said spectacles; and
wherein said soft magnetic material is selected from the group consisting of Permalloy®, carbon steel, ferrite stainless steel, Fe—Cr—Co alloy and Fe—Cr—Co—Si alloy.

16. The device as set forth in claim 15, wherein one of said first lens frames, said first nose frame, said frontal hinge members and said arms include a permanent magnet and one of said second lens frames, said second nose frame and said connecting piece include soft magnetic material.

17. The device as set forth in claim 16, wherein said permanent magnet is a magnetized alloy of iron, chromium and cobalt.

18. The device as set forth in claim 17, wherein said soft magnetic material is said Fe—Cr—Co alloy.

19. The device as set forth in claim 16, wherein said soft magnetic material is an alloy comprised of 50–65% iron, 20–30% chromium and 5–20% cobalt.

20. The device as set forth in claim 16, wherein said permanent magnet is a magnetized alloy of iron, chromium and cobalt, and silicon.

21. The device as set forth in claim 20, wherein said soft magnetic material is said Fe—Cr—Co—Si alloy.

22. The device as set forth in claim 16, wherein said soft magnetic material is an alloy comprised of 50–65% iron, 20–30% chromium, 5–20% cobalt and 0.2–0.5% silicon.

23. The device as set forth in claim 15, wherein one of said first lens frames, said first nose frame, said frontal hinge members and said arms include soft magnetic material and one of said second lens frames, said second nose frame and said connecting piece include a permanent magnet.

24. The device as set forth in claim 23, wherein said permanent magnet is a magnetized alloy of iron, chromium and cobalt.

25. The device as set forth in claim 24, wherein said soft magnetic material is said Fe—Cr—Co alloy.

26. The device as set forth in claim 23, wherein said soft magnetic material is an alloy comprised of 50–65% iron, 20–30% chromium and 5–20% cobalt.

27. The device as set forth in claim 23, wherein said permanent magnet is a magnetized alloy of iron, chromium, cobalt and silicon.

28. The device as set forth in claim 27, wherein said soft magnetic material is said Fe—Cr—Co—Si alloy.

29. The device as set forth in claim 23, wherein said soft magnetic material is an alloy comprised of 50–65% iron, 20–30% chromium, 5–20% cobalt and 0.2–0.5% silicon.

30. The device as set forth in claim 15, wherein the soft magnetic material is Permalloy® and the Permalloy® includes at least 40% nickel and 50% iron.

31. The device as set forth in claim 15, wherein the soft magnetic material is Permalloy® and the Permalloy® includes at least 70% nickel and 20% iron.

32. The device as set forth in claim 15, the Permalloy® is comprised of 76–85% nickel and 3–7% molybdenum, 3–6% copper, and the balance being iron.

33. The device as set forth in claim 15, the soft magnetic material is subjected to a heat treatment at a temperature of approximately 1100° C. for one hour in a $H_2$ environment.

34. A device for coupling spectacles and clip-on sunshades with each other, comprising:
    spectacles having first lens frames connected together at their inner ends by a first nose frame, lenses fitted into respective first lens frames, frontal hinge members fixedly connected to respective outer ends of said first lens frames, and arms mounted to said frontal hinge members through hinges, at least one of said first lens frames, said first nose frame, said frontal hinge members and said arms including a permanent magnet or soft magnetic material;
    clip-on sunshades having second lens frames connected together at their inner ends by a second nose frame, lenses fitted into respective second lens frames, and a connecting piece for coupling said clip-on sunshades to said spectacles, at least one of said second lens frames, said second nose frame and said connecting piece including a permanent magnet or soft magnetic material so as to function in a complementary way with said spectacles;
    wherein said soft magnetic material is selected from the group consisting of Permalloy®, pure iron, carbon steel, low alloy steel, ferrite stainless steel, iron-chromium-cobalt alloy and an iron-chromium-cobalt-silicon alloy; and
    wherein the soft magnetic material is welded onto adjacent parts of spectacles or clip-on sunshades.

35. The device as set forth in claim 34, wherein one of said first lens frames, said first nose frame, said frontal hinge members and said arms include a permanent magnet and one of said second lens frames, said second nose frame and said connecting piece include soft magnetic material.

36. The device as set forth in claim 35, wherein said permanent magnet is a magnetized alloy of iron, chromium and cobalt.

37. The device as set forth in claim 36, wherein said soft magnetic material is said Fe—Cr—Co alloy.

38. The device as set forth in claim 35, wherein said soft magnetic material is an alloy comprised of 50–65% iron, 20–30% chromium and 5–20% cobalt.

39. The device as set forth in claim 35, wherein said permanent magnet is a magnetized alloy of iron, chromium, cobalt and silicon.

40. The device as set forth in claim 39, wherein said soft magnetic material is said Fe—Cr—Co—Si alloy.

41. The device as set forth in claim 35, wherein said soft magnetic material is an alloy comprised of 50–65% iron, 20–30% chromium, 5–20% cobalt and 0.2–0.5% silicon.

42. The device as set forth in claim 34, wherein one of said first lens frames, said first nose frame, said frontal hinge members and said arms include soft magnetic material and one of said second lens frames, said second nose frame and said connecting piece include a permanent magnet.

43. The device as set forth in claim 42, wherein said permanent magnet is a magnetized alloy of iron, chromium and cobalt.

44. The device as set forth in claim 43, wherein said soft magnetic material is said Fe—Cr—Co alloy.

45. The device as set forth in claim 42, wherein said soft magnetic material is an alloy comprised of 50–65% iron, 20–30% chromium and 5–20% cobalt.

46. The device as set forth in claim 42, wherein said permanent magnet is a magnetized alloy of iron, chromium and cobalt.

47. The device as set forth in claim 46, wherein said soft magnetic material is said Fe—Cr—Co alloy.

48. The device as set forth in claim 42, wherein said soft magnetic material is an alloy comprised of 50–65% iron, 20–30% chromium and 5–20% cobalt.

49. The device as set forth in claim 34, wherein the soft magnetic material is Permalloy® and the Permalloy® comprised of 45% nickel and 55% iron.

50. The device as set forth in claim 34, wherein the soft magnetic material is Permalloy® and the Permalloy® is includes at least 70% nickel and 20% iron.

51. The device as set forth in claim 34, wherein the soft magnetic material is Permalloy® and the Permalloy® is comprised of 76–85% nickel and 3–7% molybdenum, 3–6% copper, and the balance being iron.

52. The device as set forth in claim 34, the soft magnetic material is subjected to a heat treatment at a temperature of approximately 1100° C. for one hour in a $H_2$ environment.

* * * * *